US008850034B1

(12) United States Patent
Amancherla (10) Patent No.: US 8,850,034 B1
(45) Date of Patent: Sep. 30, 2014

(54) SERVICE REQUEST FAST FAIL CIRCUIT BREAKER (71) Applicant: Quisk, Inc., Sunnyvale, CA (US)

(72) Inventor: Praveen Amancherla, Cupertino, CA (US)

(73) Assignee: Quisk, Inc., Sunnyvale, CA (US)

( * ) Notice: Subject to any disclaimer, the term of this patent is extended or adjusted under 35 U.S.C. 154(b) by 0 days.

(21) Appl. No.: 14/253,534

(22) Filed: Apr. 15, 2014

(51) Int. Cl.
*G06F 15/16* (2006.01)
*H04L 29/06* (2006.01)

(52) U.S. Cl.
CPC ........................................ *H04L 67/42* (2013.01)
USPC ........................................... 709/227; 709/230

(58) Field of Classification Search
CPC .................... H04L 67/22; H04L 69/40; H04L 2029/06054; G06F 17/3089; G06F 11/2025
See application file for complete search history.

(56) References Cited

U.S. PATENT DOCUMENTS

| | | | |
|---|---|---|---|
| 6,173,311 B1 | 1/2001 | Hassett et al. | |
| 6,202,149 B1 | 3/2001 | Hedegard | |
| 6,857,026 B1 | 2/2005 | Cain | |
| 6,859,834 B1 * | 2/2005 | Arora et al. | 709/227 |
| 7,263,551 B2 | 8/2007 | Belfiore et al. | |
| 7,380,163 B2 | 5/2008 | Davies et al. | |
| 7,480,725 B2 | 1/2009 | Krajewski, III et al. | |
| 7,644,171 B2 * | 1/2010 | Sturniolo et al. | 709/230 |
| 8,250,215 B2 | 8/2012 | Stienhans et al. | |
| 8,370,395 B1 * | 2/2013 | Gupta et al. | 707/799 |
| 8,539,040 B2 | 9/2013 | Luna et al. | |
| 2003/0151513 A1 | 8/2003 | Herrmann et al. | |
| 2004/0122935 A1 | 6/2004 | Blam et al. | |
| 2005/0229034 A1 | 10/2005 | Fujibayashi | |
| 2007/0005728 A1 * | 1/2007 | Elbury et al. | 709/218 |
| 2007/0013948 A1 | 1/2007 | Bevan | |
| 2013/0166447 A1 | 6/2013 | Theado et al. | |

FOREIGN PATENT DOCUMENTS

WO    2010099367 A    9/2010

OTHER PUBLICATIONS

Technical Note: Configuring link redundancy—Traffic load-balancing / load-sharing—ECMP (Equal Cost Multiple Path)—Dual Internet or WAN scenario, Fortinet, Accessed on Apr. 7, 2014, http://kb.fortinet.com/kb/viewContent.do?externalId=100137&sliceId=2.

* cited by examiner

*Primary Examiner* — Peling Shaw
(74) *Attorney, Agent, or Firm* — The Mueller Law Office, P.C.

(57) ABSTRACT

Systems and methods for processing a request from a client using a service request circuit breaker are disclosed. An exemplary system includes a request evaluator for receiving the client request and generating an external request. A request transmitter sends the external request to an external server. An external channel monitor evaluates how the external server responds to the external request. A service request circuit breaker activates in response to the monitor determining that the external server is unavailable. A persistent data store instantiates a queue. The queue stores the external request in response to the monitor determining that the external server is unavailable. The queue stores a second external request before it is sent to the external server if the service request circuit breaker is activated. The external server monitoring component evaluates how the external server responds to a periodic ping.

20 Claims, 4 Drawing Sheets

SERVICE REQUEST FAST FAIL CIRCUIT BREAKER

BACKGROUND OF THE INVENTION

Distributed computing systems rely on service requests from a client to a server. In the software as a service model, the client is generally a non-resource-intensive thin client, such as a web browser, that makes service requests to a central server that provides the requested service. In a more basic example, the client can be a point of sale terminal that sends a payment approval request to a credit card processor. In either case, the client requires a response from the server in order to operate. If the server does not respond, the client may hang in a holding pattern waiting for the server to respond, or it may abort the operation and resend another request.

In complex distributed systems, servers may also act as clients in that they are unable to conduct all of the processing requested by a client, and therefore need to prepare their own service requests for an alternative server. In these situations, the server that originally receives the client's request can be referred to as an originating server. In this kind of system, the originating server and additional external server both need to process their own service request and provide a response before the client can continue its operations. Furthermore, in cases where a request cannot be serviced, the originating server and the client need to receive a response indicating that the system has failed before they can take steps to remedy the situation.

As the pace of modern life increases, tolerance for delay in distributed computing systems continues to decrease. Furthermore, distributed computing systems are replacing local processing systems through the appeal of outsourced costs associated with hardware and software maintenance and upkeep. However, for this advantageous trend to continue, the distributed systems need to perform just as rapidly as the systems they replaced. Therefore, minimizing the amount of time that is spent facilitating communication between the client and server, and an originating server and an external server is critical for the continued acceptance and success of distributed systems.

SUMMARY

Disclosed herein are systems, methods, and computer-readable media for an account engine fast fail circuit breaker. The systems can perform the described methods. The computer-readable media can store instructions for the described methods.

A method for operating a service request circuit breaker is disclosed. The method comprises receiving a client service request at a server from a client. The method also comprises sending an external server service request from the server to an external server. A response to the external service request is required for processing the client service request. The method also comprises determining that the external server is unavailable by evaluating how the external server responds to the external server service request. The method also comprises activating a service request circuit breaker and saving the external server service request to a queue in response to determining that the external server is unavailable. The queue is instantiated in a persistent memory. The method also comprises receiving a second client service request at the server. The method also comprises generating a second external server service request. A response to the second external service request is required for processing the second client service request. The method also comprises saving the second external server service request to the queue without sending the second external service request to the external server if the service request circuit breaker is active. The method also comprises determining that the external server is available by evaluating how the external server responds to a periodic ping. The method also comprises deactivating the service request circuit breaker, removing the first external server service request from the queue, and resending the first external server service requests to the external server all in response to determining that the external server is available.

A system for processing a request from a client using a service request circuit breaker is also disclosed. The system comprises a request evaluator for receiving a client service request from the client and generating an external service request. A response to the external service request is required for processing the client service request. The system also comprises a request transmitter for sending the external server service request to an external server. The system also comprises an external channel monitor for evaluating how the external server responds to the external server service request and determining that the external server is unavailable to receive the external server service request. The system also comprises a service request circuit breaker that is activated in response to the external channel monitor determining that the external server is unavailable. The system also comprises a persistent data store providing a persistent memory used to instantiate a queue. The queue stores the external server request in response to the external channel monitor determining that the external server is unavailable. The queue stores a second external server request before it is sent to the external server in response to a determination that the service request circuit breaker is activated. An external server monitoring component evaluates how the external server responds to a periodic ping and determines if the external server is available. A queue manager removes the external server request from the queue in response to the external server monitor determining that the external server is available.

DETAILED DESCRIPTION

Reference now will be made in detail to embodiments of the disclosed invention(s), one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

Distributed systems that process high volumes of transactions benefit in multiple ways from being able to process transactions rapidly. Clearly, consumers value their time such that speed is valuable in its own right. However, high volume transaction processors also benefit from speed in that the volume of transactions they can process simultaneously is the limiting factor in their operation. For the simple reason that servers cost money, the number of servers an enterprise needs to employ directly affects the enterprise's revenues. Therefore, given a set daily volume of transactions the system needs to process, processing those transactions at a faster rate directly increases the transaction processor's profits.

Transactions processors that require external server calls are dramatically affected by interruptions in there connection with the specific external servers on which they rely, and on the time in which it takes those servers to respond. The problem is more severe than that caused by waiting for internal processing because there is no way to gauge when the external server will respond. Also, in some cases, there is no way to even know if the external server received the external server call in the first place. As a result, it is possible for an originating server to burn resources waiting for a response, and then receive no payoff besides being able to make an educated guess that the external server did not receive the request. For example, a server could wait 5 seconds for a credit card processor to approve a transaction, and not receive any response because the initial request was dropped from the communication channel and never received by the credit card processor. In situations where a key external server fails in this manner, the backlog of processing transactions at the originating server can skyrocket as multiple requests are received and are then hung up while waiting for a response from the failed server.

The backlog of transactions mentioned previously is not only an inconvenience for the clients that are awaiting a response to their request. The backlog also deals damage to the originating server itself because resources are consumed in keeping track of all of the different threads associated with the various requests. Open threads directly affect consumer server resources and make recovery from a backlog even more difficult than the flat costs of processing each transaction in the backlog. As such, it is better to immediately route incoming transactions to a queue or holding area where they will not tie up the system further as soon as a failure is detected in the external server. The system component that can be utilized to achieve such a result can be referred to as a service request circuit breaker.

Figure 1:
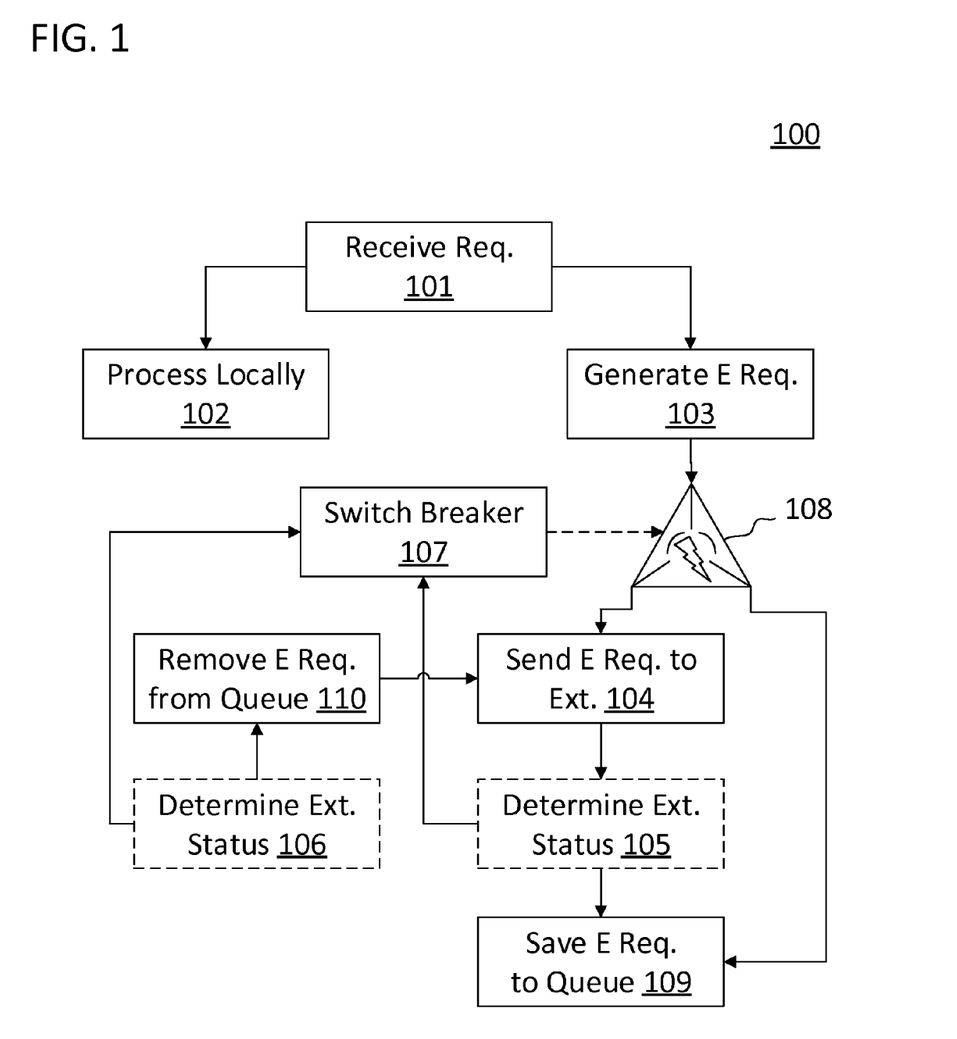
FIG. 1 illustrates methods for operating a service request circuit breaker.

A method 100 for operating a service request circuit breaker can be described with reference to FIGS. 1 and 2. Method 100 begins with step 101 in which a client service request is received from a client at a server. The client request could require the generation of an external server request. In these situations, a response to the external service request is required for responding to and processing the client service request. The external service request is a request for a service provided by an entity that is logically separate from the server that received the client service request. Communication between the server and the external server is conducted via the Internet. Furthermore, the external server is not owned or controlled by the owner and controller of the originating server. In the specific context of a payment processor, the client service request could be a fund transfer request and the external service request could be a call to a financial institution. In this situation, a response from the financial institution would be required to process the fund transfer request because the payment processor cannot inform the client that the fund transfer has been conducted until the financial institution assures that a credit obligation or account debit has been assigned to the party that is requesting the transfer of funds. As another example, the client service request could be a balance inquiry, in which case the external service request could be a balance inquiry request sent to an external server that keeps a regulated accounting of a user's funds at a financial institution. In this situation, a response from the external server is required to process the balance inquiry because the server doesn't have direct access to the regulated accounting.

System 200 can be used to conduct method 100. System 200 comprises client 201, server 202, and external server 203. In step 101, the client request is received from client 201 at server 202 via a request evaluator 204. Request evaluator 204 determines which external service request is required for processing the client service request, and in turn generates the external service request for transmission to external server 203. Client 201 is illustrated as a user with a basic mobile telephone. However, client 201 can be any electronic device applied by a user of system 200 for sending messages. For example, client 201 could be a smart phone, a tablet, a laptop, a workstation, a point of sale terminal, or any kind of electronic device with a user interface. Client 201 can also be an automated user of system 200 such as a bulk transaction processor that utilizes system 200 to process a large body of transactions without human intervention.

Request evaluator 204 may be able to receive client requests from multiple channels including any number of the devices mentioned previously. The client requests can be translated to a canonical system format by request evaluator 204 prior to determining whether or not an external service request needs to be generated. Request evaluator 204 can also make a determination as to whether or not the client request can be serviced locally—in which case no external service request is generated. If an external service request is required, it can be generated by request evaluator 204 and be delivered to request transmitter 205. The external service request can also be generated by a separate logical component. The separate component can be suited for particular external service requests or it can be more generally suited for any external service request. In these situations, request evaluator 204 can beneficially translate the request into a canonical system format before the external request is generated. If the separate component is designed for particular external service requests, request evaluator 204 can conduct a preliminary interrogation of the request to assure it is routed to the proper component. Returning to the example of a payment processor, a transfer funds request from a credit card could be routed to one component while a deposit funds request could be routed to a different component. These additional components could then generate the external server request based on the canonically formatted client request or the raw forwarded client request.

Method 100 continues with either step 102 or the combination of steps 103 and 104. Step 102 involves local processing of the client request and is conducted if request evaluator 204, or some other component, determines that the client service request can be processed locally. Steps 103 and 104 involve the generation and transmission of an external server service request to an external server 203 via request transmitter 205. For example, certain payment processors authorize transactions through access to a source of information that is one step removed from the official record regarding the account holder's account. In this example, the server may be able to access a data location in which an approval flag or running balance is stored and approve a fund transfer request without accessing an official record of the account's balance stored on an external server. In this situation, the request evaluator 204 could determine that the request was for a fund transfer below a predetermined amount and process the transaction locally in step 102. In these situations, the actual request could then be processed through access to the external server at a later time. In another example, the request evaluator 204 could determine whether or not the client service request could be processed locally by determining a type of service request to which the client service request belonged. In this example, the request evaluator would not need to access details of the particular service request and could instead route it immediately based on the type of request it represented. Types of requests that could be processed locally could include balance inquiries or account locking requests, while requests involving movement of funds through financial networks, such as a send ACH request, could be processed via the generation of an external request. Request transmitter 205 can be responsible for formatting an external server request from the system's canonical format into the format required by external server 203 as well as the transport protocol required by network 206. For example, in situations where network 206 is the Internet, request transmitter 205 can be responsible for packaging the request in HTTP compliant packets.

Method 100 continues with step 105 in which an external channel monitor, such as external channel monitor 207, determines if the external server is not available to receive external server service requests by evaluating how the external server responds to the external server service requests. The external channel monitor 207 is drawn having a separate connection to network 206 to show that monitoring can involve a separate physical interaction with network 206 in addition to sending external server requests. However, external channel monitor 207 can instead make a determination as to the availability of external server 203 solely through monitoring the regular communications between external server 203 and server 202. External channel monitor 207 can also be instantiated on external server 203, and does not need to be instantiated by a separate logical component or physical device. The determination made in step 105 can be conducted through the use of a periodic ping monitor that continually checks the status of either network 206 or requests a basic response from external server 203. As will be explained later, the same monitor can be used to make a determination that the external server has returned to service after a period of unavailability. In step 106, a determination is made as to the status of the availability of the external server after a period in which the external server was unavailable. In situations where the determination in step 105 is conducted via an active approach such as a periodic ping monitor, step 106 can take the place of both itself and step 105 in the diagram. To represent this, both steps are outlined in dotted markings to show that their positions in the diagram can overlap.

If external channel monitor 207 determines in step 105 that the external server is not available, method 100 continues with steps 107 and 109 in which a service request circuit breaker 108 is activated and the external server request is saved to a queue. The circuit breaker 108 was not addressed in the previous discussion of steps 103 and 104 because the quiescent state of circuit breaker 108 is a deactivated state in which generated external requests are immediately sent to an external server for processing. However, once activated, external service requests are not sent to the external server. Instead, the method proceeds from step 103 to step 109 in which the external server request is saved in a queue. As such, once a second external server request is received by server 200, after the circuit breaker has been activated, the second external server service request will be saved to a queue without first being delivered to an external server. This approach provides significant benefits when it is utilized to handle communications with external servers because the public communication line to the external server both uncontrolled and unreliable, and also because it is difficult or impossible to monitor the status of an external server directly. The approach of triggering the circuit breaker off a component that monitors the channel and how the external server responds avoids the need for blind reliance on the external server's performance without requiring full access to the workings of the external server.

Figure 2:
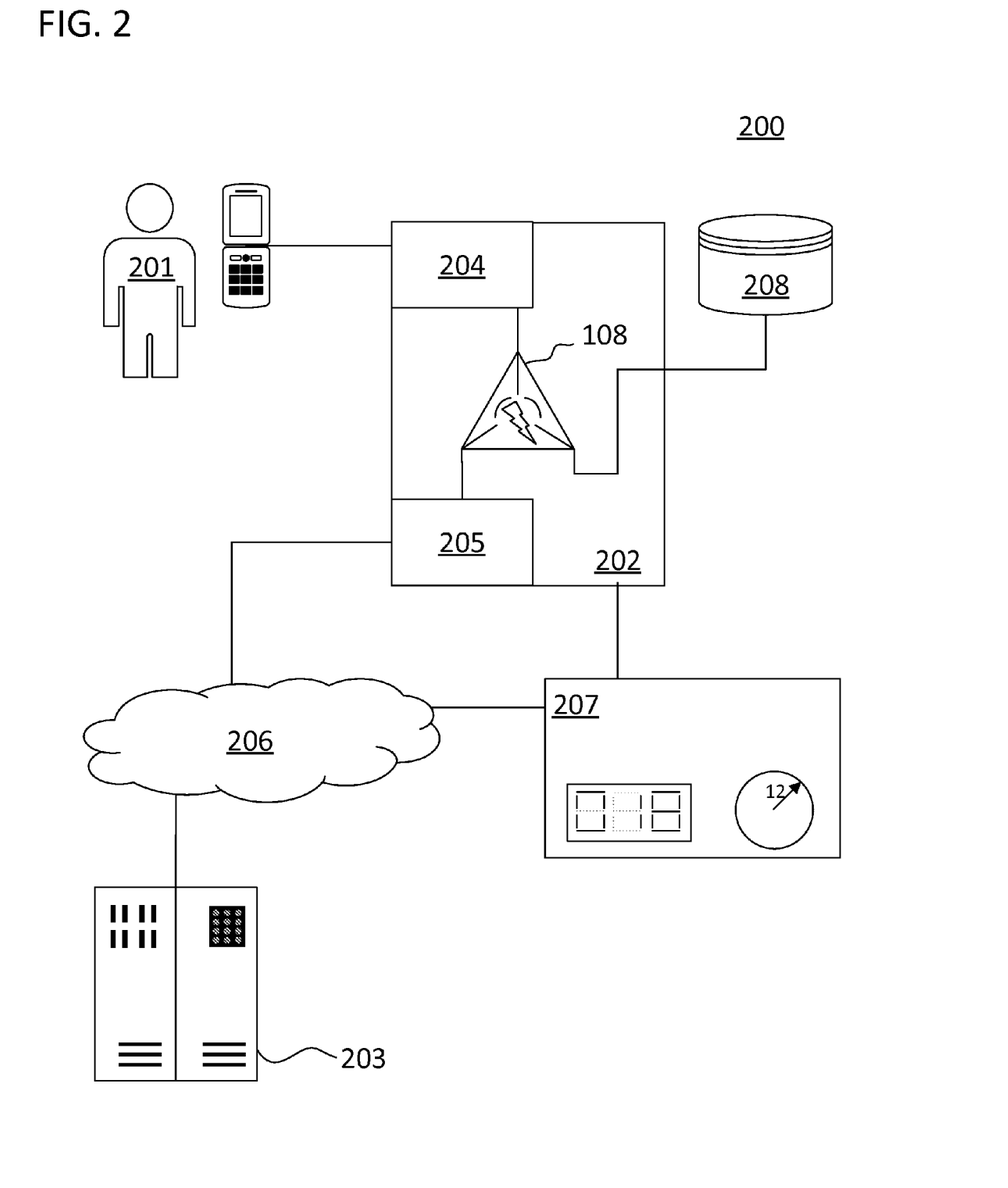
FIG. 2 illustrates a system that utilizes a service request circuit breaker.

The queue in which the external server service requests are stored is instantiated in a persistent memory such as persistent data store 208 shown in FIG. 2. The persistent data store can comprise any persistent data structure and can be physically supported by a magnetic, optical, or electronic storage. The persistent data store could be a local disk, a database, or a storage area network. The persistent data store could be an enterprise quality flash memory drive. Saving the external server request to a persistent memory provides significant benefits in that the resources of server 202 are freed up to handle additional requests that may only need to be processed locally, to respond to client 201 to let them know that the request has been queued, or to apply additional resources towards monitoring external server 203 through the aide of external channel monitor 207. Therefore, storing external server requests in persistent memory, and doing so immediately upon receipt of client requests when the circuit breaker is tripped, minimizes the degree to which server resources are consumed when an external server is nonresponsive.

External channel monitor 207 can determine that server 203 is not available using various forms of analysis. As mentioned previously, external channel monitor 207 can utilize a timer and determine that server 203 is not available based on the time value of the timer exceeding a predetermined time out period. However, the external channel monitor 207 can also analyze the response of server 203 to a periodic ping signal sent to the server to which the server is required to offer a basic response. The external channel monitor 207 can also work in combination with the request generator 205 by utilizing a counter to measure a number of additional external service quests sent from the server 202 to the external server 203.

The manner in which a determination as to the availability of the external server can be made by using a timer can be described with reference to FIG. 2. External channel monitor 207 can include a timer that starts to run as soon as an external server request is sent by server 202 to external server 203. The external channel monitor 207 can determine if the external server 203 is not available by comparing the time value of the timer to a predetermined time out period. In these approaches, the time out period can be set based on ex ante knowledge regarding the average time it takes for external server 203, or similar servers, to respond to a particular external server service request. For example, if the average time to respond to a credit card transaction processing request was 1 second, the predetermine time out period could be set to 2 seconds. If 2 seconds elapsed without hearing a response, external channel monitor 207 could trip circuit breaker 108. The time out period can also be adjusted based on an evaluation of the performance of external server 203. For example, if external channel monitor 207 detected that the external server 203 was taking longer to respond to service requests on average, the time out period could be adjusted upwards to reflect the fact that the server 203 might be moving through a period in which a large volume of transactions were being processed.

The manner in which a determination as to the availability of the external server can be made by using a counter can also be described with reference to FIG. 2. A determination as to the availability of the external server 203 can be made by counting a number of additional external service requests that are generated by server 202 and sent to the external server 203 using a counter. In other words, the external channel monitor can count the number of external server service requests that have been sent to external server 203 without receiving a response. The additional external service requests can be associated with different client service requests or they can be forwarded versions of an original external service requests associated with a single client service request. The external channel monitor can thereby determine that the external server is unavailable by comparing the number of additional external service requests to a predetermined number. For example, if five requests to an external server have been sent without receiving a response, the external channel monitor will consider the external server unavailable and will activate circuit breaker 108 such that additional requests are not sent.

The predetermined number that is utilized by a counter in external channel monitor 207 can be based on various factors to adjust the sensitivity of the circuit breaker. The predetermined number could vary based on the type of service being requested such that the predetermined number was higher for critical service requests. This approach would provide certain benefits in that a high priority request would be given more chances to fail before the request was queued while lower priority requests were queued more quickly to free up resources on server 202. The degree by which the predetermined number was adjusted upwards could be used to balance the importance of a particular kind of service request against the commensurate increase in resource consumption caused by not tripping the circuit breaker at an earlier time. The predetermined number can also be set based on a rate by which additional client service requests are being received by server 202. This approach would provide certain benefits in that the external server 203 would be given more chances to process requests if the originating server was processing a lower volume of transactions at a given time. In these situations, server 202 can afford to wait longer because it is not dealing with a large number of incoming client requests. The predetermined number could also be based on an identity of the external server and a set of historical data concerning the performance of the external server. For example, if a particular server had a history of being unavailable at certain periods of the day, the circuit breaker could trip more quickly at that time of day for requests sent to that server. As another example, if a particular server had a history of poor responsiveness in general, the predetermined number could be adjusted downward for any request sent to that server.

Both the time out period for the timer and the predetermined number provide certain benefits when they are set to higher values. Allowing a slight buffer between when the system detects that the external could be unavailable and when the circuit breaker trips provides certain benefits to the system as a whole and not just to an individual request. Since it take system resources to reset the circuit breaker and unwind the queue, it can be better in certain circumstances to tolerate a slight period of potential unavailability from the external server and not trip the server to avoid those resource costs.

Method 100 continues with step 106 in which a determination is made that the external server is available to process external server requests. This determination can be made by analyzing information obtained through either active or passive monitoring systems. Active monitoring systems include a periodic ping signal sent from server 200 to external server 203 while passive monitoring systems include request transmitter 205 continuing to monitor for a response to the request from external server 203. The active monitoring systems can be activated by circuit breaker 108 switching to an activated state. Alternatively, the active monitoring systems can be persistent and can be used to conduct step 105 when the initial determination is made that the server is unavailable. Finally, a combination of both an active and passive monitoring system can also be utilized such that a response from a periodic ping or a response to a request can be detected to determine that the external server has returned to an available state.

Figure 3:
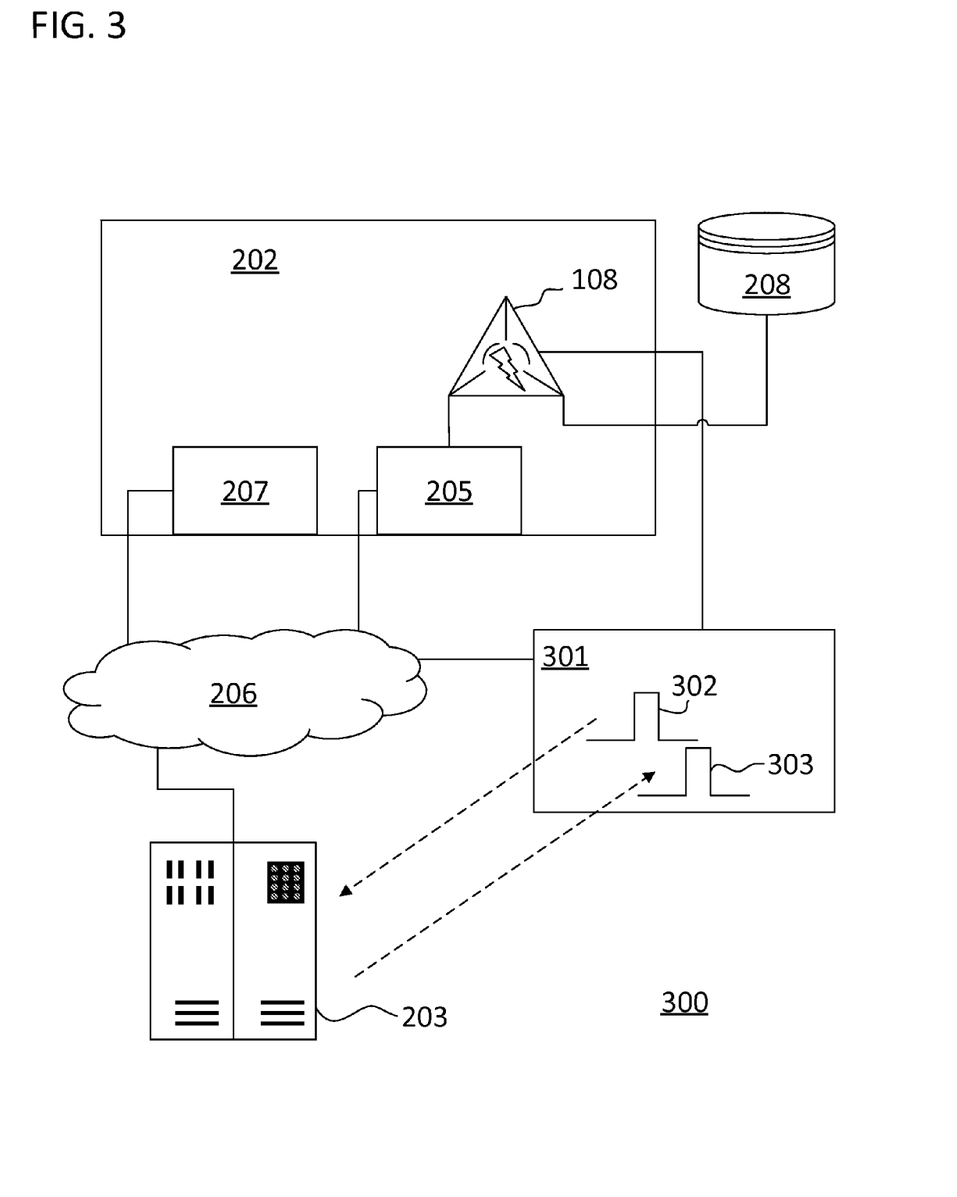
FIG. 3 illustrates a system that utilizes a service request circuit breaker, and a periodic ping external server monitor.

The determination in step 106 can be made using an active monitoring mechanism such as a periodic ping sent by external server monitoring component 301 in system 300 of FIG. 3. In this approach, external server monitoring component 301 begins to send a periodic ping signal to external server 203 as soon as circuit breaker 108 is tripped. Then, as soon as the external server 203 responds to the periodic ping signal, external server monitoring component 301 determines that external server 203 is available in accordance with step 106.

As mentioned previously, the active mechanism for determining that the external server is available in step 106 can be the same active mechanism used to determine that the server became unavailable in step 105. In this approach, external channel monitor 207 could make both the determination as to the unavailability of external server 203 as well as the return of external server 203 to availability. For example, external channel monitor 207 could continuously monitor the health of external server 203 using a periodic ping signal in parallel with the communication of service requests and responses between server 202 and external server 203. The periodic signal can also be intermingled with the regular communication of service requests and responses between server 202 and external server 203.

Passive monitoring methods can involve either request transmitter 205 or external channel monitor 207 monitoring for the response from server 203 that server 202 was originally waiting for. In these approaches, server 202 can maintain the thread of the request that tripped circuit breaker 108 so that a response from external server 203 can be detected as if the circuit breaker 108 had never been tripped. Although, this moves slightly against the resource benefits of the circuit breaker, in that the original thread needs to be kept open, additional service requests will still short circuit through step 104 to prevent the build-up of a resource intensive back log of additional requests. In a variation of this passive monitoring approach, a portion of any external server request sent to external server 203 can be maintained after circuit breaker 108 has been activated such that server 202 can recognize the server response to any of those requests, and a determination as to the availability of the external server can be made in this manner.

A combination of active and passive monitoring systems can be described with reference to FIG. 3. External server monitoring component 301 can have separate access to network 206 such that a periodic ping 302 can be sent to external server 203 while leaving open the possibility that a response to the original service request will be received from external server 203 at server 202. If a responsive ping 303 is received from the external server 203, then external server monitoring component 301 could inform server 202 that the circuit breaker should be deactivated and any queued external server requests could be taken out of persistent memory and sent to external server 203. However, server 202 can respond to the availability of external server 203 in different ways as will be described below.

In certain approaches, method 100 continues with steps 110 and 107. In step 107, circuit breaker 108 is deactivated. In step 110, an external request is removed from the queue such that it can be sent to the external server in a second iteration of step 104. The entire queue can then be de-queued and sent to the external server in sequence. Furthermore, additional requests that are received by the server while the queue is being de-queued can either be inserted into the stream of requests as they are being de-queued, or they can be sent to persistent memory and be treated as if they had been received while the server was not available.

Figure 4:
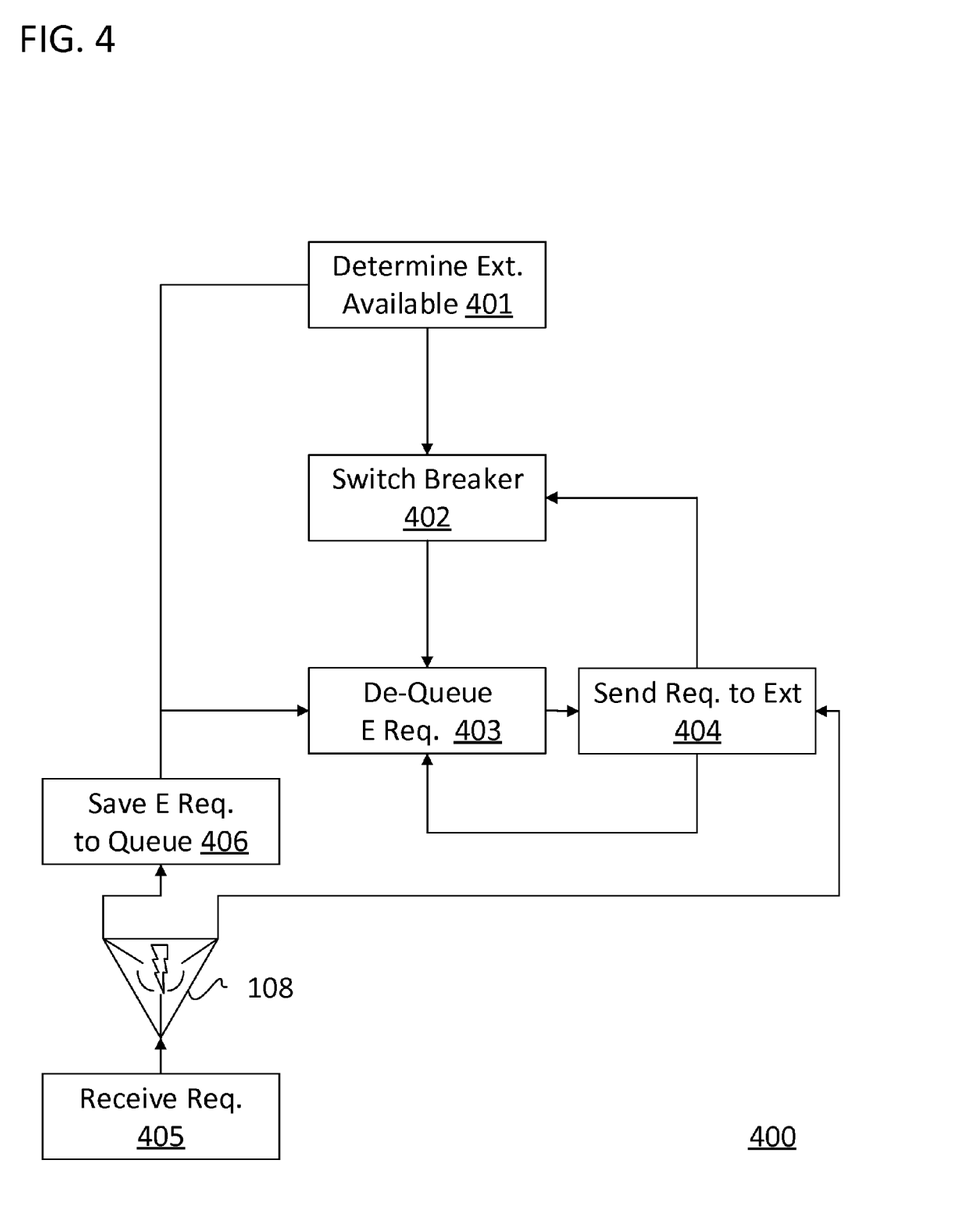
FIG. 4 illustrates methods for responding to the deactivation of a service request circuit breaker.

Different approaches for responding to the external server returning to availability can be described with reference to method 400 in FIG. 4. In step 401, a determination is made that the external server has returned to availability. The method can then proceed to either step 402, in which the circuit breaker is deactivated, or to step 403 in which the first external request is de-queued. The first external request to be de-queued can be selected based on a first-in-first-out basis or on a last-in-first-out basis. The persistent memory can also store a cross-reference to the queue in which the criticality of the requests is stored, and the first external request to be de-queued can be selected in priority order. The method can proceed to either of these two steps because the circuit breaker can remain in place while the entire queue is processed. In this approach, the method cycles back and forth between steps 403 and 404 while the list is processed, while each request is de-queued and the sent to the external server in step 404. The de-queuing process can be directed by a queue manager that is instantiated on the server. Simultaneously, additional requests can be received from clients in step 405 and then be saved to the queue in step 406. Step 403 can move on to de-queue the requests received in iterations of step 406 after all of the requests are dealt with. Once the entire queue had been processed, the method can move to step 402 in which the circuit breaker is deactivated. Alternatively, the circuit breaker can be deactivated immediately following step 401. In this approach, requests that are received in step 405 will be sent to the external server in step 404 without first being saved to persistent memory. In these situations, requests will be de-queued and delivered to the external server in tandem with new requests being received and delivered. In any of these approaches, determining that the external server is available can include sending a bulk response to all of the clients associated with the queued requests to let them know that the external server is restored and that their requests will be processed soon.

Although embodiments of the invention have been discussed primarily with respect to specific embodiments thereof, other variations are possible. Various configurations of the described system may be used in place of, or in addition to, the configurations presented herein. Those skilled in the art will appreciate that the foregoing description is by way of example only, and is not intended to limit the invention. For example, nothing in the disclosure should be read to limit the server to one that processes payment transactions. However, the servers that process the transactions could be similar to the account server, described in U.S. Patent Publication No. 2009/0024533 A1 for "Payment Systems and Methods" filed Aug. 29, 2007, or U.S. patent application Ser. No. 13/755,421 for "Self-authenticating peer-to-peer transaction" filed Jan. 31, 2013, both of which are owned by the assignee of the present invention, and both are incorporated by reference herein in their entirety.

In general, any diagrams presented are only intended to indicate one possible configuration, and many variations are possible. Those skilled in the art will also appreciate that methods and systems consistent with the present invention are suitable for use in a wide range of applications encompassing any related to the processing of client service requests.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A method for operating a service request circuit breaker, in which each step is computer-implemented, comprising:
   receiving a first client service request at a server from a client;
   sending a first external server service request from the server to an external server, wherein a response to the first external server service request is required for processing the first client service request;
   determining that the external server is unavailable by evaluating how the external server responds to the first external server service request;
   in response to determining that the external server is unavailable: activating the service request circuit breaker; and saving the first external server service request to a queue, wherein the queue is instantiated in a persistent memory;
   receiving a second client service request at the server;
   generating a second external server service request, wherein a response to the second external service request is required for processing the second client service request;
   if the service request circuit breaker is active, saving the second external server service request to the queue without sending the second external service request to the external server;
   determining that the external server is available by evaluating how the external server responds to a periodic ping; and
   in response to determining that the external server is available, deactivating the service request circuit breaker, removing the first external server service request from the queue, and resending the first external server service requests to the external server.

2. The method of claim 1, further comprising:
   running a timer after sending the first external service request from the server to the external server;
   wherein the determining that the external server is unavailable comprises comparing a time value of the timer to a predetermined time out period.

3. The method of claim 1, further comprising:
   in further response to determining that the service request circuit breaker is active, sending the second external server service request from the server to a second external server.

4. The method of claim 1, further comprising:
   determining that the external server is unavailable to receive the external server service request by evaluating how the external server responds to the periodic ping.

5. The method of claim 1, further comprising:
   receiving a third client request at the server;
   generating a third external server service request, wherein a response to the third external service request is required for processing the third client service request;
   if the queue is not empty, saving the third external server service request to the queue without sending the third external service request to the external server regardless of whether or not the service request circuit breaker is active or inactive.

6. The method of claim 1, wherein:
determining that the external server is unavailable to receive the external server service request further comprises counting a number of additional external service requests and comparing the number of additional external service requests with a predetermined number;
wherein the additional external service requests are forwarded versions of the external server service request that are sent within a predetermined time interval.

7. The method of claim 6, wherein:
the predetermined number is set based on a criticality of the client service request; and
the predetermined number increases with the criticality.

8. The method of claim 6, wherein:
the predetermined number is set based on a rate by which additional client service requests are being received by the server.

9. The method of claim 6, wherein:
the predetermined number is set based on an identity of the external server and a set of historical data concerning the performance of the external server.

10. A system for processing a request from a client comprising:
a request evaluator instantiated on a server for receiving a client service request from the client and generating an external server service request, wherein a response to the external server service request is required for processing the client service request;
a request transmitter for sending the external server service request to an external server;
an external channel monitor for evaluating how the external server responds to the external server service request and determining that the external server is unavailable to receive the external server service request;
a service request circuit breaker that is activated in response to the external channel monitor determining that the external server is unavailable;
a persistent data store providing a persistent memory used to instantiate a queue, wherein the queue stores the external server service request in response to the external channel monitor determining that the external server is unavailable, and wherein the queue stores a second external server request before it is sent to the external server in response to a determination that the service request circuit breaker is activated;
an external server monitoring component evaluating how the external server responds to a periodic ping and determining if the external server is available; and
a queue manager that removes the external server request from the queue in response to the external server monitoring component determining that the external server is available.

11. The system of claim 10, further comprising:
a timer that runs when the request transmitter sends the external server service request to the external server;
wherein the external channel monitor determines that the external server is unavailable by comparing a time value of the timer to a predetermined time out period.

12. The system of claim 10, wherein:
the request transmitter sends the second external server service request from the server to a second external server if the service request circuit breaker is active; and
the second external server service request is removed from the queue if the second external server is available.

13. The system of claim 10, wherein:
the service request circuit breaker is activated in response to the external server monitoring component evaluating how the external server responds to the periodic ping.

14. The system of claim 10, wherein:
the request evaluator generates a third external server service request; and
the third external server service request is saved to the queue if the queue is not empty regardless of whether or not the service request circuit breaker is active or inactive.

15. The system of claim 10, further comprising:
a counter that counts a number of additional external service requests sent to the external server by the request transmitter without receiving a response from the external server;
wherein the external channel monitor compares the number of additional external service requests with a predetermined number as part of the determining that the external server is unavailable to receive the external server service request; and
wherein the additional external service requests are forwarded versions of the external server service request that are sent within a predetermined time interval.

16. The system of claim 15, wherein:
the predetermined number is set based on a criticality of the client service request; and
the predetermined number increases with the criticality.

17. The system of claim 15, wherein
the predetermined number is set based on a rate by which additional client service requests are being received by the server.

18. The system of claim 15, wherein
the predetermined number is set based on an identity of the external server and a set of historical data concerning the performance of the external server.

19. A non-transitory computer readable medium storing instructions for a server to conduct a method comprising:
receiving a client service request at a server from a client;
sending an external server service request from the server to an external server, wherein a response to the external server service request is required for processing the client service request;
determining that the external server is unavailable by evaluating how the external server responds to the external server service request;
in response to determining that the external server is unavailable: activating a service request circuit breaker; and saving the external server service request to a queue, wherein the queue is instantiated in a persistent memory;
receiving a second client service request at the server;
generating a second external server service request, wherein a response to the second external server service request is required for processing the second client service request;
if the service request circuit breaker is active, saving the second external server service request to the queue without sending the second external server service request to the external server;
determining that the external server is available by evaluating how the external server responds to a periodic ping; and
in response to determining that the external server is available, deactivating the service request circuit breaker, removing the first external server service request from the queue, and resending the first external server service requests to the external server.

20. The non-transitory computer readable medium of claim 19, wherein:
  determining that the external server is unavailable to receive the external server service request further comprises counting a number of additional external service requests and comparing the number of additional external service requests with a predetermined number; and
  wherein the additional external service requests are forwarded versions of the external server service request.

* * * * *